United States Patent [19]

Marsh, Jr.

[11] 4,389,763

[45] Jun. 28, 1983

[54] APPARATUS FOR JOINING PIPE SECTIONS BY JACKING

[76] Inventor: Richard O. Marsh, Jr., 703 Standard Life Bldg., Pittsburgh, Pa. 15222

[21] Appl. No.: 219,514

[22] Filed: Dec. 23, 1980

Related U.S. Application Data

[63] Continuation-in-part of Ser. No. 967,965, Dec. 11, 1978, abandoned.

[51] Int. Cl.$^3$ .............................................. B23P 19/04
[52] U.S. Cl. ......................................... 29/237; 29/252; 29/523; 29/525; 254/29 R
[58] Field of Search ................. 29/237, 252, 523, 525; 254/29 R; 403/279; 285/382.4, 345, 374

[56] References Cited

U.S. PATENT DOCUMENTS

| | | | |
|---|---|---|---|
| 1,615,008 | 1/1927 | Ferguson | 29/237 |
| 3,208,136 | 9/1965 | Joslin | 29/458 |
| 3,210,102 | 10/1965 | Joslin | 285/374 |
| 3,233,315 | 2/1966 | Levake | 29/237 |
| 3,458,920 | 8/1969 | Crump | 29/237 X |
| 3,469,298 | 9/1969 | Pizzagalli | 29/237 |
| 3,924,413 | 12/1975 | Marsh, Jr. | 285/345 X |
| 3,927,457 | 12/1975 | Bickle | 29/237 |
| 4,053,247 | 10/1977 | Marsh, Jr. | 285/382.4 X |

*Primary Examiner*—Charlie T. Moon
*Attorney, Agent, or Firm*—Buell, Blenko, Ziesenheim & Beck

[57] ABSTRACT

Apparatus and method for applying couplings of the force fit type disclosed in U.S. Pat. Nos. 3,924,413 and 4,053,247 to sections of plain end pipe to join the pipe sections together, utilizing apparatus and structures respectively exterior to and internal of the pipe sections, whereby the reaction force of a jack applying a compression force via the tensioning of the structures to a coupling at one end of a pipe section operates to exert an applying force to the coupling at the opposite end of the pipe section. Several forms of apparatus are disclosed respectively suited to different types of situations in which plain end pipe sections are joined, such as in off shore oil well drilling or in installation of transmission pipe in a horizontal position above or below ground level.

2 Claims, 13 Drawing Figures

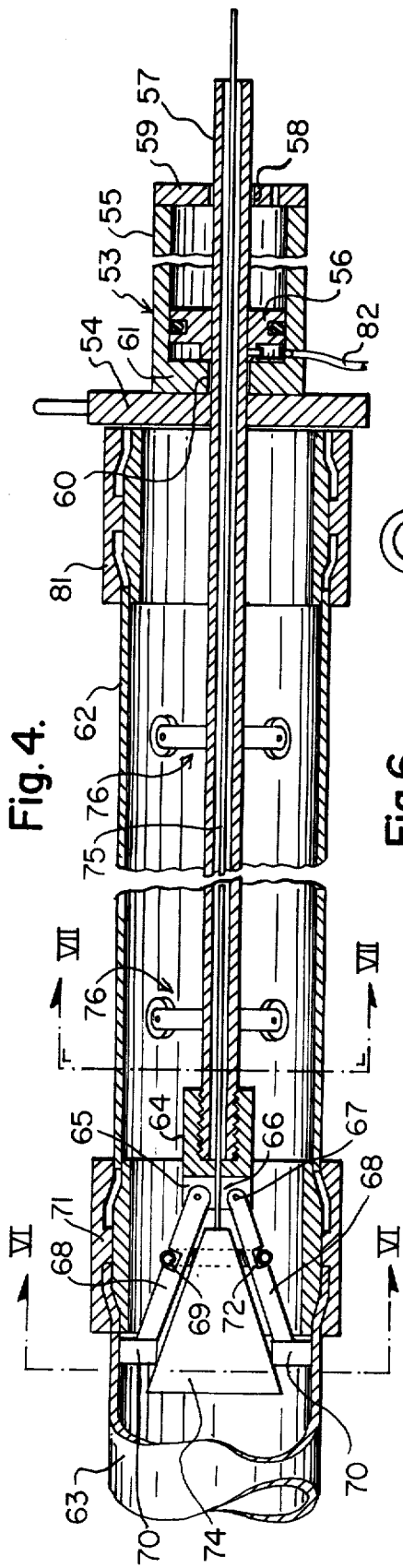
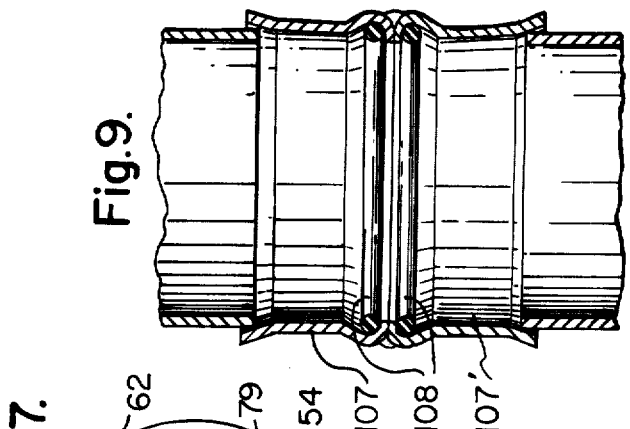
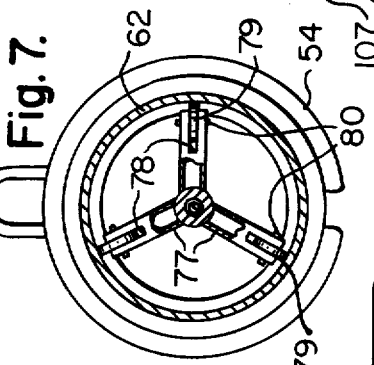
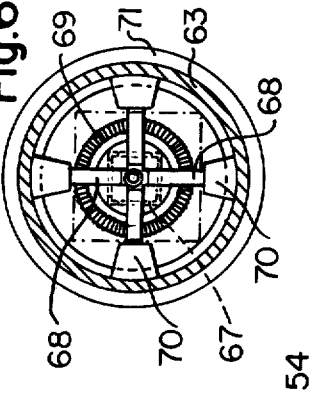
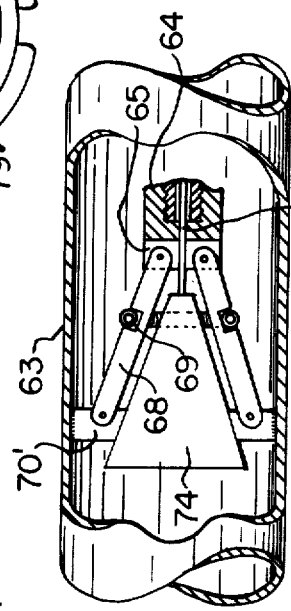
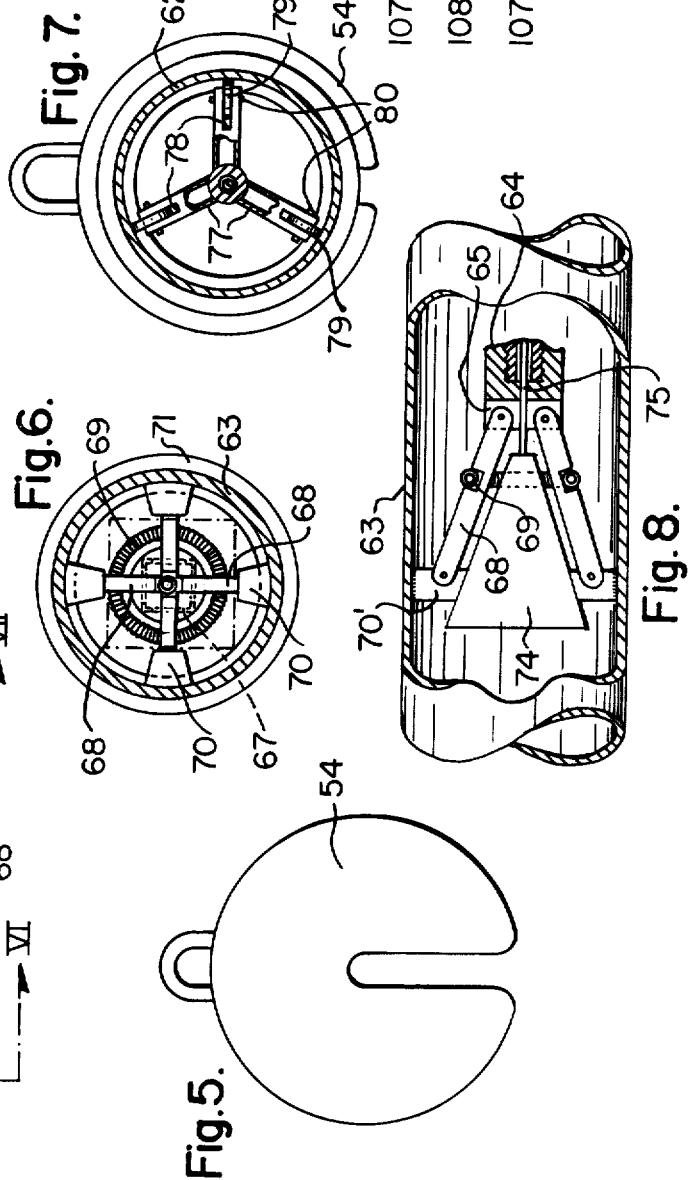

APPARATUS FOR JOINING PIPE SECTIONS BY JACKING

This invention has been registered in the Patent and Trademark Office under the Disclosure Document registration program, Registration No. 073601. This application is a continuation-in-part of my prior application U.S. Ser. No. 967,965, filed Dec. 11, 1978, now abandoned.

This invention relates to apparatus and methods for joining sections of plain end pipe by applying couplings thereto. Suitable couplings are disclosed in my prior U.S. Pat. Nos. 3,924,413 and 4,053,247. The couplings of U.S. Pat. Nos. 4,053,247 and 3,924,413 are sold respectively under the registered trademarks "Marnick" and "Expando". For easy identification and reference to the couplings, I will use these trademarks hereinafter in connection with the word "coupling".

The term "plain end pipe" is well understood and used in the industry to refer to pipe with ends as regularly furnished by the mills when no special treatment is specified. Plain end pipe is square cut or beveled but has not further treatment, such as belling, grooving, threading, flanging or slitting.

The Marnick and Expando couplings were developed originally for use in the pipe pile driving industry, where they are installed by impaction with a pile driving hammer. However, the impaction method of application of these couplings is not readily employed in certain situations and industries and I have found that it is possible to more readily and easily employ a method of installation of the couplings to the pipe sections in those situations and industries, by which method the couplings are forced on the pipe pile sections by jacks of the hydraulic or mechanical type.

I am aware that pipe lines have heretofore been coupled together with drive fit or force fit couplings by a jacking method. In this connection reference may be had to U.S. Pat. Nos. 3,208,136 and 3,210,102 disclosing the so-called "Zap-Lock" joint. In the aforesaid method, the jacking reaction has been obtained by a tension system employing devices which clamp on the pipe. While this system works with small diameter (4" to 6") pipe of light wall thickness (usually 0.135") it is not applicable to large diameter heavy wall pipe, largely, because it is impractical to provide clamping devices adequate to withstand the higher stresses involved in joining large diameter heavy wall pipe by jacking.

The Marnick and Expando couplings are similar in that both are installed by direct force only and work with plain end pipe or pipe pile, as distinguished from threaded, grooved, belled or fabricated pipe ends or fittings. The two couplings differ in that the Marnick coupling provides high tensile strength whereas the Expando coupling has low tensile strength but is less costly. In both couplings there is deformation of metal. In the case of the Marnick coupling the deformation is in the pipe and completely contained and controlled. In the case of the Expando coupling, the deformation is in the coupling itself which is stretched and expanded over the pipe to form a tight metal-to-metal friction joint. Both couplings permit initial entry of the pipe without force and then require considerable force for movement onto the pipe. The Marnick coupling is employed where high tensile strength is required or high pressures are involved where high tensile strength is not required and lower pressures are involved, the less costly Expando coupling is employed.

I have found that, because of its high strength under tension, the Marnick coupling is especially adapted for use in off shore oil well drilling where several hundred feet of conductor pipe are installed prior to the actual drilling operation. In the situation where the drilling is initiated from a Marine platform which may be located in ocean water that is a hundred or more feet deep with the "working" deck a hundred feet above the level of the water, the conductor pipe is customarily delivered to the platform in approximately 40 foot lengths. The first length of pipe is then lowered through the drill head mechanism until only several feet are above the deck and then held suspended by a clamping device. A second section is then placed in end-to-end relation above the first section and then welded to it. The 80 foot section is then lowered until only several feet are above the deck, at which time the suspended pipe sections are held supported by a clamping device in the drill head mechanism and another section of pipe joined to the suspended pipe by a welding operation. Successive sections of pipe are added to the suspended pipe by similar operations until the conductor pipe reaches and has achieved a bearing on the ocean floor. When the conductor pipe sinks no further under its own weight, it is driven into the ocean floor with a large pile driving hammer to a depth of several hundred feet until it has reached the desired penetration as determined by geological conditions. During the above process, 40-foot pipe sections are added, one at a time, welded and driven. The welding is the most time consuming operation. The conductor pipe may be from 20 to 36 inches in diameter with a wall thickness of ½ inch or more. Welding these pipe sections together is particularly costly because during the welding operation, the rest of the crew is just standing by. Moreover, such a Marine platform may have as many as ten or more wells. While welding is in process, none of the adjacent wells can be allowed to produce oil or gas because of the fire and explosion hazard.

The Marnick coupling is patently advantageous as it eliminates the need for welding the successive sections of pipe.

Another application in which the Marnick coupling is advantageous is in the installation of horizontal transmission lines. In this application, when used with plain end pipe, the Marnick coupling provides a faster and more economical method of joining the pipe sections and avoids fire and explosion hazards associated with welding in the presence of flammable substances such as oil and gas.

It is accordingly an object of this invention to provide a method and structures to enable pipe sections to be joined together through force fit couplings such as the Marnick and Expando couplings, by a tension and tension reaction system utilizing a jacking arrangement wherein the forces are applied through the couplings without employing friction clamping devices.

It is a further object of the invention to provide a method and a rigid structure for holding the pipe sections in rigid alignment to enable joining sections of large diameter and heavy wall pipe through force fit couplings, first utilizing a tension and tension reaction system and then, as in off shore drilling operations after the pipe is lowered sufficiently to seat on the ocean floor, utilizing conventional pile driving equipment supported on the structure, in lieu of the jacking equipment.

Another object is to provide structure for applying force fit couplings simultaneously to opposite ends of a pipe section by a jacking method in which tension forces exerted by the jack are transmitted via the structural members to a coupling at one end of a pipe section and the reactive force of the jack applies a force to a coupling at the opposite end of the pipe section.

It is a further object of the invention to provide a method and structure for joining sections of large diameter and heavy wall pipe through force fit couplings, utilizing a tension and tension reaction system contained within the pipe sections themselves.

In carrying out the above objects, I provide in one embodiment of my invention a structural column of four members arranged rectangularly and open on one side to enable a pipe section to be moved laterally into the structure and thereby held in rigid alignment for end-to-end connection to a coupler at the upper end of a section of pipe held suspended in a lower position. An adjustable yoke in the column supports the lower section of pipe in a vertical position by engaging the force fit collar attached at the upper end of the pipe. A jack, such as a hydraulic ram, interposed between a platform fixed on the column and a movable platform exerts a reaction force on a force fit coupling at the top of a second section of pipe held in vertical alignment with the first section.

I also provide an arrangement adapted particularly for joining sections of pipe lying in a horizontal position, by means supported within the pipe sections. Expansible fingers carried on the end of a tube which is supported longitudinally within a pipe section engage the end of a force fit coupling on the end of the pipe section. A wedge member activated by a rod which extends through the tube causes the fingers to expand. The reaction force of the jack or ram which pulls on the tube acts on a force fit coupling at the corresponding end of the pipe section.

I further provide apparatus for joining sections of pipe lying in a horizontal position employing a plurality of tension rods supported exteriorly of the pipe sections, on a plurality of arcuate links. One set of arcuate links engages the inner end of a force fit coupling on the end of a pipe section already in place. A jack or ram exerts a force via the tension rods to the inner end of said coupling and the reaction force of the jack is applied to a sliding member supported on the rods which engages the outer end of a coupling at the other end of a second pipe section to be joined to the section already in place.

Additional details of the method and apparatus I provide for attaining the above objects will become apparent from the following description of several embodiments of my invention when read in connection with the following drawings, wherein:

FIG. 4 is an elevational view of tension and reaction apparatus for joining sections of horizontal pipe, wherein the apparatus is located internally of the pipe;

FIG. 5 is a view showing additional features of a member of the apparatus of FIG. 4;

FIG. 6 is a sectional view, taken essentially on the line VI—VI of FIG. 4, showing additional details of the expansible links and means of their activation;

FIG. 7 is a sectional view, taken on the line VII—VII of FIG. 4, showing additional details;

FIG. 8 is a fragmental sectional view of a modification of the expansible links of FIG. 4;

FIG. 9 is a fragmental sectional view of the Expando type of force fit coupling herein referred to;

Figure 1:
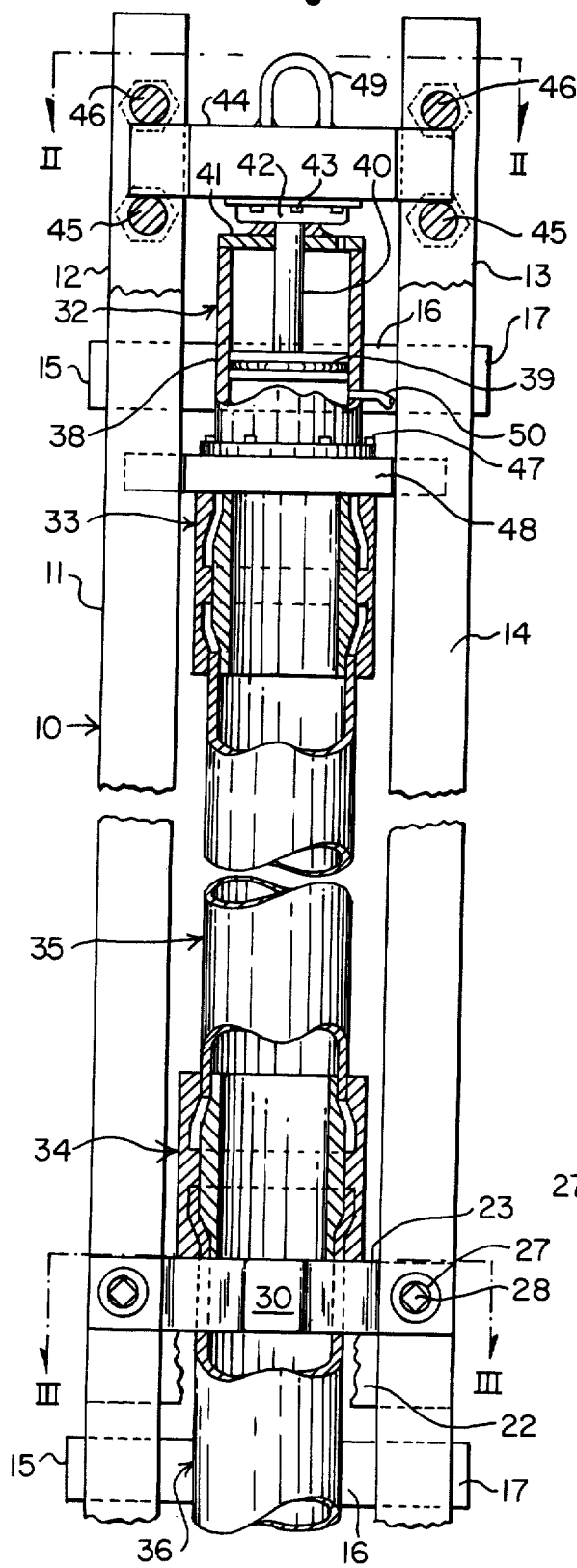
FIG. 1 is a fragmental view of a vertical structural column embodying a tension and reaction system for joining sections of pipe together through force fit couplings.
Figure 2:
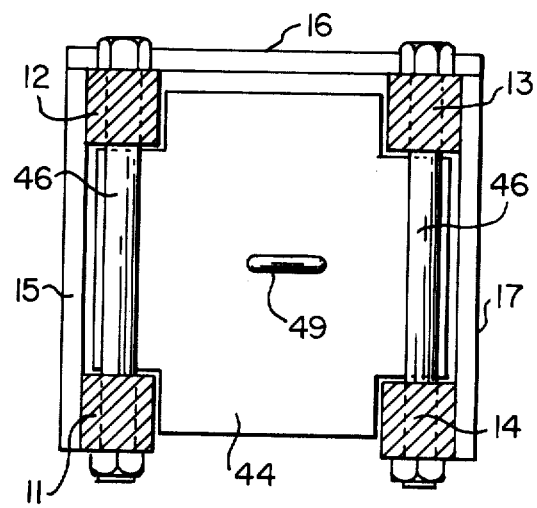
FIG. 2 is a sectional view, taken on the line II—II of FIG. 1, showing the arrangement of the column members.
Figure 3:
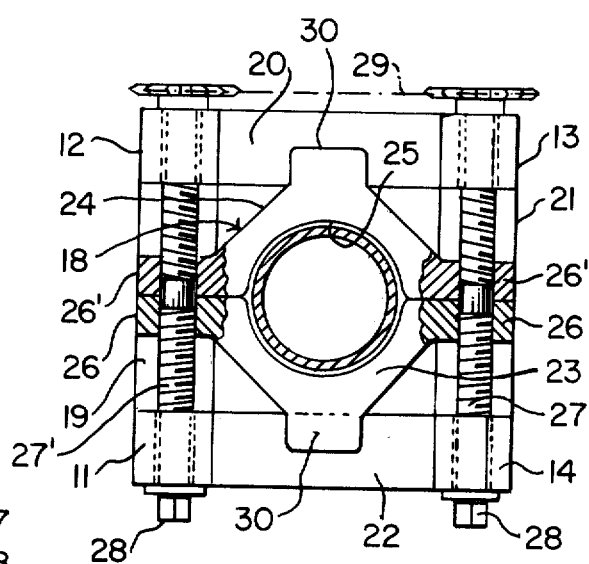
FIG. 3 is a sectional view, taken on the line III—III of FIG. 1, showing details of the adjustable yoke.

Referring to FIGS. 1-3 of the drawings, the apparatus therein shown comprises a structural column 10 supported in a vertical position, as shown on a marine platform not shown, and comprising four members 11-14 arranged and spaced from each other so as to form a hollow square or U. The members 11-14 are of conventional tubular steel structure form. A plurality of sets of members, 15, 16 and 17 connect the members 11-14 on three sides, leaving one side open to receive a section of pipe, which may be of the order of 40 feet in length and 36 inches or larger in diameter.

An adjustable yoke 18 is supported on cross members 19, 20, 21 and 22 between the column members 11-14. The yoke comprises two similar mating elements 23 and 24 formed to provide a circular bore 25 when in closed position, the diameter of which conforms closely to that of the outside diameter of the sections of pipe to be joined. The elements 23 and 24 of the yoke are each formed with diametrically disposed lugs 26 and 26' having registering tapped holes for receiving corresponding threaded rods 27 and 27'. Rods 27 and 27' have reverse threads on opposite ends thereof so that when the rods 27, 27' are rotated in one direction the yoke elements 23, 24 separate, and conversely, when the rods 27, 27' are rotated in the opposite direction, the elements 23, 24 move toward each other to form the circular bore 25. As shown, one end of each rod 27, 27' is formed with a square shank 28 to receive a socket wrench or similar tool for effecting rotation of the rods. The rods 27, 27' may be coupled together, as by sprocket wheels and chain 29, so that rotation of only one rod, 27, 27' will effect rotation of both rods and cause both ends of the yoke elements to move concurrently.

In order to maintain the yoke elements in alignment with each other in a horizontal plane, oppositely extending lugs 30 are provided thereon which rest on the cooperative cross members 20 and 22 respectively.

A jack or ram mechanism 32 is provided in the top of column 10 for applying tension and reaction forces to install force fit couplings 33 and 34 of the Marnick type on opposite ends of a pipe section 35 which is to be coupled to a pipe section 36 held and supported lower in the column 10.

The jack mechanism 32 comprises a cylinder 38 in which a piston 39 operates, the piston having a piston rod 40 which extends slidably through a hole in the cylinder head 41. On the outer end of the piston rod 41 is a flanged disc 42 which is attached, as by screws 43, to a rectangular plate 44. Plate 44 is recessed at the four corners to fit within the four column members, 11-14 and is locked to the column member by two pairs of rods 45 and 46. The two rods 45 extend horizontally through holes in the column members at one level and the two rods 46 extend horizontally through the column members at a higher level. The plate 44 is firmly held and locked between the rods 45 and 46.

The lower end of cylinder 38 is flanged and has attached thereto, as by screws 47, a rectangular plate 48 having recesses at the four corners to enable it to move slidably along the column members 11-14.

It should be understood that when assembled together to form the jack mechanism 32, the assembly may be lifted or lowered by a crane having a hook which engages in a loop 49 secured, as by welding, to the top surface of the plate 44.

The embodiment comprising the foregoing elements, may be employed to install the conductor pipe in a Marine off shore oil well drilling operation in the following manner.

Assume that the columnar structure 10 is appropriately erected in a vertical position in the drilling platform supported or mounted a hundred or more feet above the ocean surface. Let it be further assumed that a force fit coupling 34 of the Marnick type is first pressed on or applied by an impactor to the upper end of a pipe section 36. By means of a crane, the pipe section 36 is now erected in a vertical position within the columnar members 11-14 and then lowered vertically through the yoke 18 and drill head mechanism (not shown) until only the several upper feet project above the drilling platform. The yoke 18 is then closed around the pipe section 36 and the pipe section lowered to cause the lower end of coupling 34 to rest on yoke 18. The pipe section 36 is thus suspended from the yoke 18 due to the tension strength of the coupling.

The next step in the operation is to swing another section of pipe 35 laterally into the open column and lower it in vertical alignment with pipe section 36 until the lower end of the plain end pipe slides of its own weight into the annular pocket at the upper end of coupling 34. After pipe section 35 is suitably secured in this position, the jack or ram mechanism 32 is lowered into position with the plate 44 resting on the lower pair of rods 45, the upper pair of rods 46 having first been removed, and the plate 48 contacting the upper end of coupling 33 which was first installed on the upper end of the pipe section 35. The upper pair of rods 46 are now re-installed, thereby locking the jack mechanism 32 to the columnar members 11-14.

Now upon the supply of liquid under pressure to the cylinder 38, as through a pipe or hose 50, tensile forces are transmitted via the members 11-14 and the yoke 18 to the lower end of coupling 34 while the reaction forces exerted by the cylinder 38 of the jack mechanism through plate 48 are applied on the upper end of coupling 33. The couplings 33 and 34 are thus simultaneously and concurrently pressed on the respective ends of the pipe section 35 to the full depth of the annular sockets in the couplings.

It will be understood that the annular sockets in opposite ends of the Marnick coupling comprise two annular spaces of different diameter connected by a tapering annular portion. Thus, as the couplings are pressed over the respective ends of the pipe section 35, the circumference of the pipe is expanded to provide a high tensile strength in the coupling.

Upon completion of the above operation whereby the two couplings are installed or fully pressed on to the pipe section, the rods 46 are removed and the jack mechanism 32 lifted out of its position. The pipe sections 35 and 36 are now lowered together, after opening the yoke 18, until the upper pipe section 35 rises only several feet above the platform. Yoke 18 is now closed under the coupling 33 to provide a support for suspending both sections of pipe 35 and 36.

Another section of pipe may now be installed in place within the columnar members 11-14 and the operation repeated as before described, until the lower most section of pipe strikes the ocean floor after the pipe sections cease to sink further of their own weight, they may be driven further by impaction into the ocean floor. Driving of the pipe sections into the ocean floor is accomplished by placing a pile driver of conventional design on the top of columnar members 11-14 and impacting the end of the uppermost pipe section.

The rigid columnar member provides a distinct extension of the length of pipe to which the lower end is clamped. Accordingly a section of pipe which is inserted within the columnar members for inserting into a coupling will be aligned with the previous pipe. The rigidity of the columnar members will align the hydraulic jack with the newly fitted pipe sections and prevent the jack from sliding off the end of the pipe. Likewise a pile driver is held in fixed position relative to the end of the pipe.

The above described apparatus is adapted for use in joining pipe sections of a horizontal pipe line provided the columns 11-14 and other associated parts are mounted on skids, wheels, or a wheeled vehicle of some sort. Also the apparatus may be shifted horizontally along a horizontal pipe line by a crane.

There are some disadvantages to employing the abovedescribed apparatus for joining sections of a horizontal pipe line which I overcome by employing instead a modified form of apparatus, shown in FIGS. 4, 5, 6 and 7, contained almost entirely within the pipe line sections. This embodiment has the advantage of minimal space requirement. The advantages of this interior embodiment are especially evident in the case of laying pipe in a trench. It will be seen that space requirements at each side or under the pipe sections are much less than with the first embodiment, or when the pipe sections are joined by welding or by conventional mechanical couplings.

Referring to FIGS. 4-7, the apparatus for joining pipe sections there shown comprises a jack or ram 53, a slotted plate 54 against which the head of cylinder 55 of the jack 53 seats. A piston 56 which operates in the bore of cylinder 55 is suitably fixed to a hollow piston rod 57 that extends through a bearing sleeve 58 that lines a hole in the non-pressure head 59 of cylinder 55. The hollow piston rod 57 also extends through a sleeve liner 60 in a hole of pressure head 61 and longitudinally through the pipe section 62 which is to be joined to an adjacent pipe section 63.

On the distal end of the hollow piston rod 57 is mounted, as by screw threads, a sleeve fitting 64. The fitting 64 has two slots 65 and 66 cut or formed in the outer end thereof at a right angle to each other. Pivotally mounted at opposite ends of the slots 65 and 66 as on pins 67 are pairs of links 68. At the outer extremity of each link 68 is formed or attached a short arcuate foot or shoe 70 for engaging the end of a coupling 71 which is intended to be pressed on the end of pipe section 62. A circular helical spring 69 is fitted into recesses 72 in the outer edge of links 68 to bias the links inwardly toward the axis of the pipe section 62.

A pyramid-shaped element 74, having four sides, is attached to the end of a rod 75 that extends lengthwise through the bore of the hollow piston rod 57 to the end adjacent jack 53. Rod 75 is arranged to be pulled or pushed longitudinally by suitable mechanical means (not shown). When rod 75 is pulled the pyramid element 74 activates the links 68 outwardly simultaneously, against the bias of spring 69, until the shoes 70 are in axial registry with the end of the coupling 71 inside pipe section 63.

In view of the length of the pipe sections 62 and 63, possibly forty or more feet in length, the hollow piston rod 57 is provided along its length inside the pipe section 62 with a plurality, shown as two, of radially arranged supports 76. Supports 76 comprise short tubular members or pipes 77 having end slots 78 in which small discs or wheels 79 of rubber or similar resilient material are rotatably mounted as on pins 80. As shown in FIG. 7, the wheels 79 contact the inner surface or bore of the pipe section 62 and thus provide a mobile support for the piston rod 57.

In operation, let it be assumed that coupling 71 has already been pressed over the end of pipe section 63 and that it is desired to join pipe section 62 to pipe section 63. Pipe section 62 is first positioned horizontally in axial alignment with the coupling 71 and pressed part way into the annular socket of the coupling. Another coupling 81 is inserted over the end of pipe section 62 opposite to coupling 71. The piston rod 57 is then moved through the pipe section 62 until the links 68 are opposite the coupling 71. The slotted plate 54 is then inserted between the coupling 81 and the pressure head 61 of the jack 53.

At this time, rod 75 is pulled outwardly to hold the links 68 in their outer position in which the shoes 70 are in alignment with the end of the coupling 71 inside pipe section 62 and hydraulic pressure is applied to the pressure chamber side of piston 56 via hose or pipe 82.

It will thus be seen that the jack 53 simultaneously applies a tension force to coupling 71 whereas a reaction force is exerted by jack 53 through the slotted plate 54 on the end of coupling 81. In consequence of the tension and reaction forces applied to couplings 71 and 81 as just described, pipe section 62 is forced or pressed into the annular slot of coupling 71 to the full depth and at the same time coupling 81 is pressed on the opposite end of pipe 62 to the full depth of the annular slot in the coupling 81.

Additional pipe sections are successively coupled to the pipe end having the open-ended coupling thereon in the manner just described.

It will be seen that the embodiment just described lends itself admirably to joining pipe sections lying in a trench with little or no clearance around or under the pipe.

Referring to FIG. 8, a modification of the apparatus in the previous embodiment for applying tension to a coupling is shown. In this modification, the shoes 70' on the links 68 do not need to engage the end of the coupling 71. Instead, the shoes have a gripping surface such as knurling, on the outer rim thereof for biting into the wall of the pipe section 63 when the links 68 are expanded due to a pull in the pyramid element 74. Thus, by exerting a pull on pipe section 63, a tension force is transmitted to coupling 71 while the reaction force of jack 53 is exerted via plate 54 on the coupling 81. In other respects the operation for joining piping sections is similar to that already described.

Referring to FIGS. 10, 11, 12 and 13, a modification of the apparatus already described is shown for joining pipe sections lying in a horizontal position. This modification distinguishes from that of FIGS. 4-7 in that it is external to the pipe sections to be joined, though in principle the method of joining pipe sections by tension and reaction forces is the same.

The apparatus of this embodiment comprises a jack mechanism 32' similar to that of the first described embodiment, but differing in that the force of the hydraulic pressure acting on the piston within the cylinder is exerted on a plate 85 whereas the reaction force of the cylinder is applied via a plate 86.

Before continuing the description, let it be assumed that it is intended to join two pipe sections 87 and 88 and that force fit couplings 89 and 91 of the Marnick type are respectively applied to the opposite ends of pipe sections 87 and 88 respectively.

The apparatus of this embodiment further comprises a plurality, illustrated as three in number, of tension rod 92, 93 and 94 which are supported in angularly spaced relation around the pipe sections to be joined, and which extend longitudinally from the end plate 85 along the pipe sections.

Figure 11:
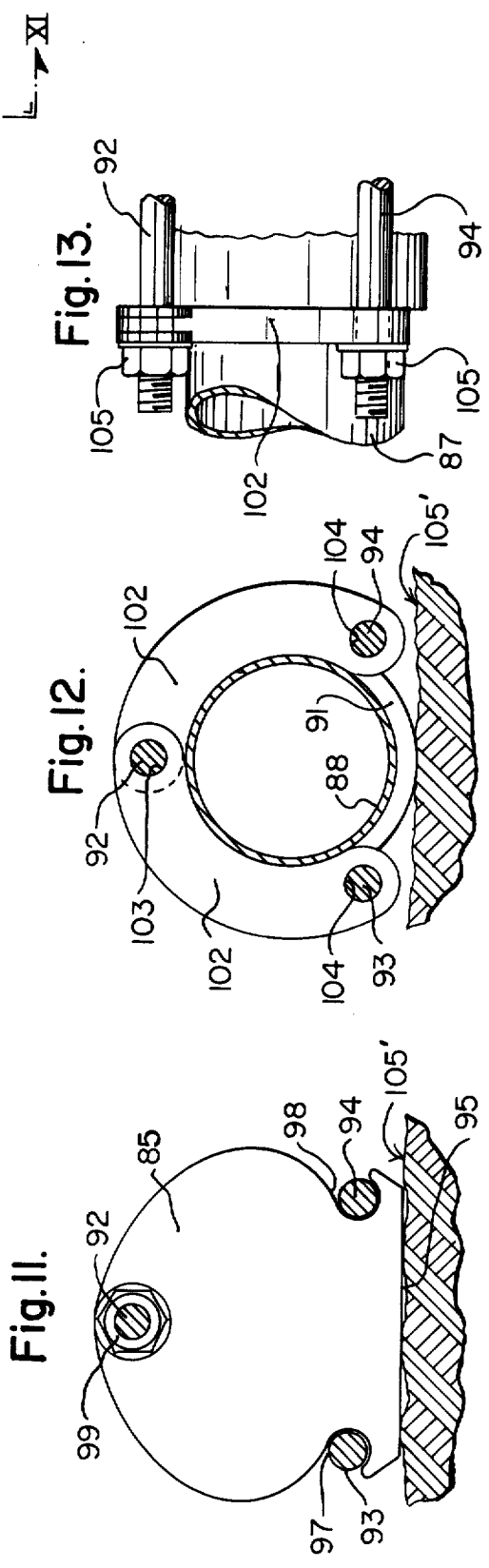

The plates 85 and 86 correspond in contour and in other respects. As seen in FIG. 11, these plates have a nearly circular contour with a flat surface 95 at one point. Opposite the flat surface is a hole 96 of a diameter closely conforming in diameter to that of rods 92-94. Spaced equal angles on opposite sides of the hole 96 are circular recesses 97 and 98 which are a short distance above the flat surface 95.

The end of one of the tension rods such as rod 92, is secured to plate 85 through a hole 96 by a pair of nuts 99 engaging threads on rod 92. The outer rods 93 and 94 are laid loosely in the recesses 97 and 98 respectively of plates 85 and 86 with a nut 101 screwed on the ends.

The tension rod 92 extends slidably through the hole 96 in plate 86 while rods 93 and 94 lie loosely in their respective recesses 97 and 98 in plate 86.

Figure 12:
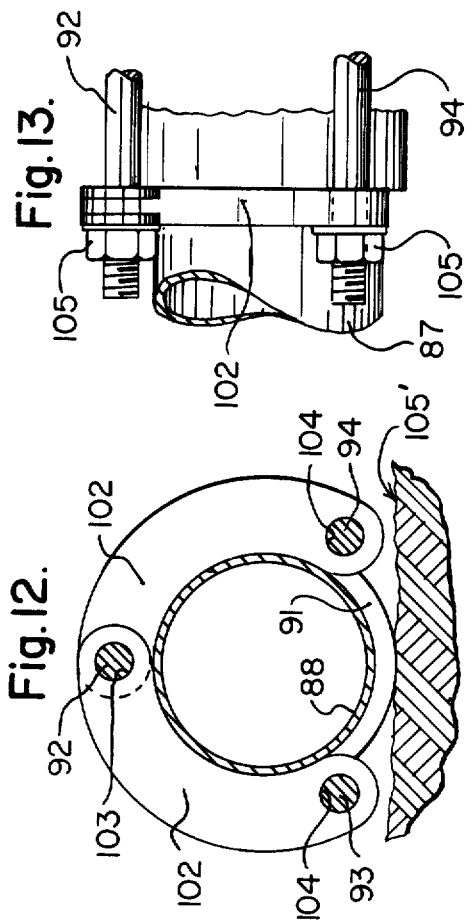
FIGS. 11 and 12 are sectional views, taken generally on the lines XI—XI and XII—XII respectively of FIG. 10.

Additional support for the tension rods 92-94 is provided by a number of pairs of curved links 102, shown particularly in FIG. 12, spaced along the length of the tension rods. The links 102 are curved to conform to the exterior diameter of the pipe sections and are joined by a tongue and groove type of hinge. Support for the links is provided by the tension rod 92 which extends through a hole 103 of closely conforming diameter in the links.

Figure 10:
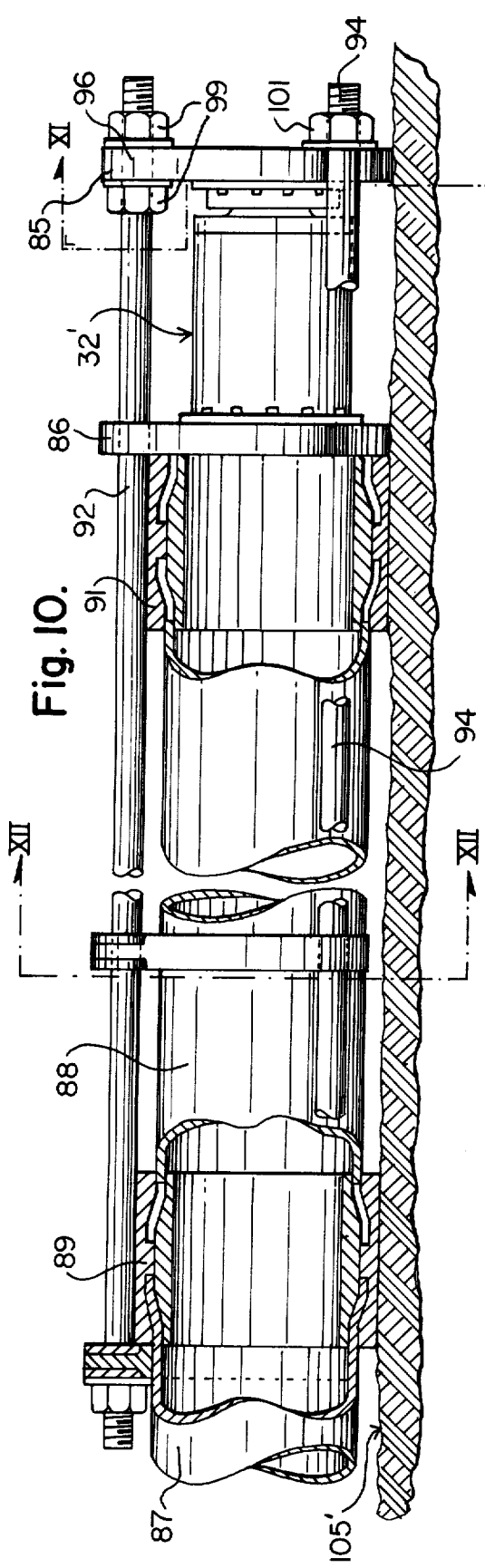
FIG. 10 is an elevational view of another embodiment of apparatus for joining sections of horizontally disposed plain end pipe through force fit couplings, wherein the tension members are rods supported externally of the pipe sections.
Figure 13:
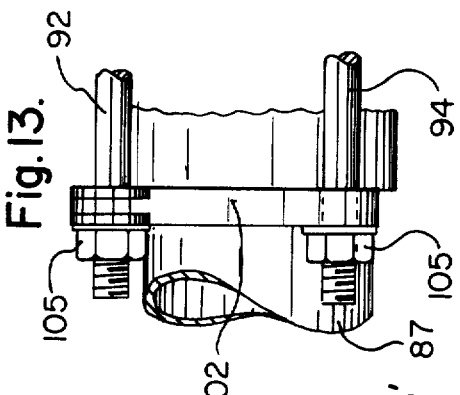
FIG. 13 is an elevational view, in outline, corresponding to the sectional portion at the left-hand end of FIG. 10.

Near the extremities of the curved links opposite the hinged joint, are holes 104 through which the tension rods 93 and 94 extend. As shown in FIGS. 10 and 13, each of the tension rods 92, 93 and 94 is provided with a nut 105 at the end adjacent the last in the series of pairs of links 102.

The jack 32', the plates 85 and 86, the rods 92, 93 and 94 and the several sets of curved links 102 may be lifted up together as a unit, as by a crane, and placed in position over the pipe sections 87 and 88, as shown in FIG. 10. Once in this position, jack 32' may be expanded by the hydraulic fluid under pressure supplied to the pressure chamber side of the piston therein through hose 50'. It will thus be seen that jack 32' applies tension to the coupling 89 at one end of pipe section 88 whereas the reactive force of jack 32' exerted on plate 86 is applied to the coupling 91 at the opposite end of the pipe 94.

With forces thus applied by expansion of the jack 32', the coupling 91 is pressed onto the end of pipe section 88 and the opposite end of pipe section 88 penetrates the annular socket of coupling 89 to the full depth.

After the pipe section 88 is coupled to pipe section 87, the jack 32' is released and placed in position over pipe section 88 and a pipe section to be added to those already in position. The operation just described is then repeated each time it is desired to add a section of pipe to that already installed. Though not shown, it will be understood that suitable runners or wheels may be provided to move the structure with the jack mechanism 32' along the ground 105'.

While the invention has been described as coupling sections of pipe through a coupling of the Marnick type, it will be apparent that pipe sections may be joined through couplings, of the Expando type depicted in FIG. 9. As will be evident, the Expando type of coupling comprises a pair of pan-shaped elements 107 and 107' back-to-back. The side walls of each pan are flared slightly thus enabling them to be initially entered by the pipe sections and bent back under tension to form a tight seal on the surface of the pipe section. Grommets or rings of rubber 108 are preferably inside each pan-shaped element to seal on the wall of the pipe at the end as it is driven home to the bottom of the pan-element.

The operation of the various types of apparatus herein described, to couple sections of pipe through couplings of the Expando type, will be essentially the same as described for the Marnick coupling.

While specific embodiments are herein shown and described for coupling pipe sections through force fit couplings of the Marnick type, it will be understood that variations of the apparatus and method herein described may be made within the terms of the following claims.

I claim:

1. Apparatus for joining a plain end pipe section to another through force fit couplings, said apparatus comprising a hydraulic jack having a cylinder and a piston operable therein, a hollow piston rod for said piston supported coaxially within said pipe section, a slotted plate member straddling said piston rod and interposed between said cylinder and coupling at one end of said pipe section, expansible means carried by said hollow piston rod and activated by a rod telescopically movable within said hollow piston rod for engaging a coupling at the opposite end of said pipe section, said piston being operable when subject to fluid pressure to apply a tension force through said piston rod and said expansible means to the last mentioned coupling and to simultaneously apply a reaction force to the coupling at said one end of the pipe section through said slotted plate member.

2. Apparatus for joining a plain end pipe section to another through force fit couplings according to claim 1, wherein a plurality of support members are attached to the said hollow piston rod along the length thereof to maintain it in coaxial relation to the said pipe section, each of said support members comprising a plurality of radially disposed arms in each of which is a wheel of cushioning material that rolls along the interior surface of the pipe section.

* * * * *